United States Patent
Phillips

(10) Patent No.: US 10,099,525 B1
(45) Date of Patent: Oct. 16, 2018

(54) TRAILER HITCH DRAWBAR TIGHTENING MECHANISM

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days.

(21) Appl. No.: 16/012,995

(22) Filed: Jun. 20, 2018

(51) Int. Cl.
*B60D 1/52* (2006.01)
*B60D 1/14* (2006.01)
*F16B 21/16* (2006.01)

(52) U.S. Cl.
CPC ............ *B60D 1/143* (2013.01); *B60D 1/52* (2013.01); *F16B 21/165* (2013.01)

(58) Field of Classification Search
CPC .......... B60D 1/143; B60D 1/52; F16B 21/165
USPC ........................................................ 280/495
See application file for complete search history.

(56) References Cited

U.S. PATENT DOCUMENTS

| | | | |
|---|---|---|---|
| 2,917,323 A * | 12/1959 | Mandekic | B60D 1/44 280/470 |
| 4,131,256 A * | 12/1978 | F'Geppert | B60K 5/10 248/316.4 |
| 4,214,772 A * | 7/1980 | Carr | B60D 1/07 280/416.1 |
| 4,961,589 A * | 10/1990 | Faurenhoff | B60D 1/44 248/352 |
| 6,406,051 B1 | 6/2002 | Phillips | |
| 8,910,964 B2 * | 12/2014 | Bogoslofski | B60R 9/06 280/507 |
| 9,956,922 B2 | 5/2018 | Phillips | |
| 2015/0083770 A1 | 3/2015 | Ziola | |
| 2018/0105000 A1 * | 4/2018 | Phillips | B60D 1/58 |

* cited by examiner

*Primary Examiner* — Jacob D Knutson
(74) *Attorney, Agent, or Firm* — John V. Stewart

(57) ABSTRACT

A drawbar for a trailer hitch receiver tube has a translation screw passing from the back end to the front end of the drawbar in a longitudinal unthreaded passage in the drawbar. A ramp nut is threaded onto the translation screw and is retained in a ramp nut chamber in the front end of the drawbar. A captive ball is retained in a captive ball retention chamber passing between the ramp nut chamber and the exterior of the drawbar. A ramp on the ramp nut pushes the ball to extend beyond the exterior of the drawbar when the translation screw is turned to pull the ramp nut backward in the ramp nut chamber. This eliminates all play between the drawbar and the receiver tube in which the drawbar is inserted. A spring between the ramp nut and the drawbar may urge the ramp nut forward.

18 Claims, 2 Drawing Sheets

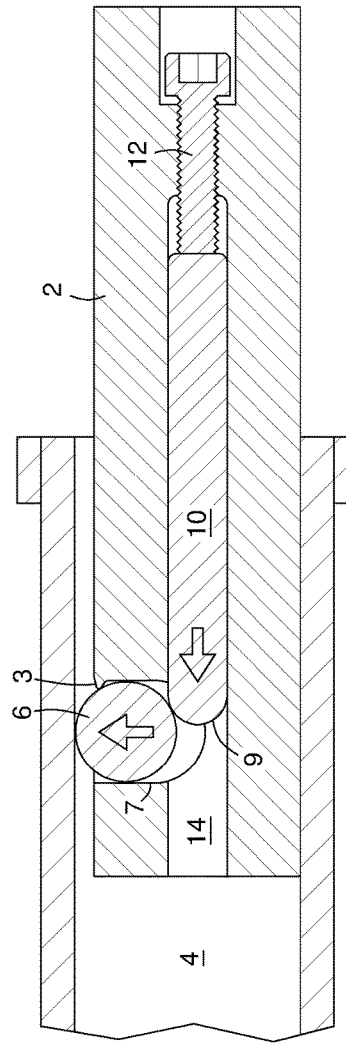
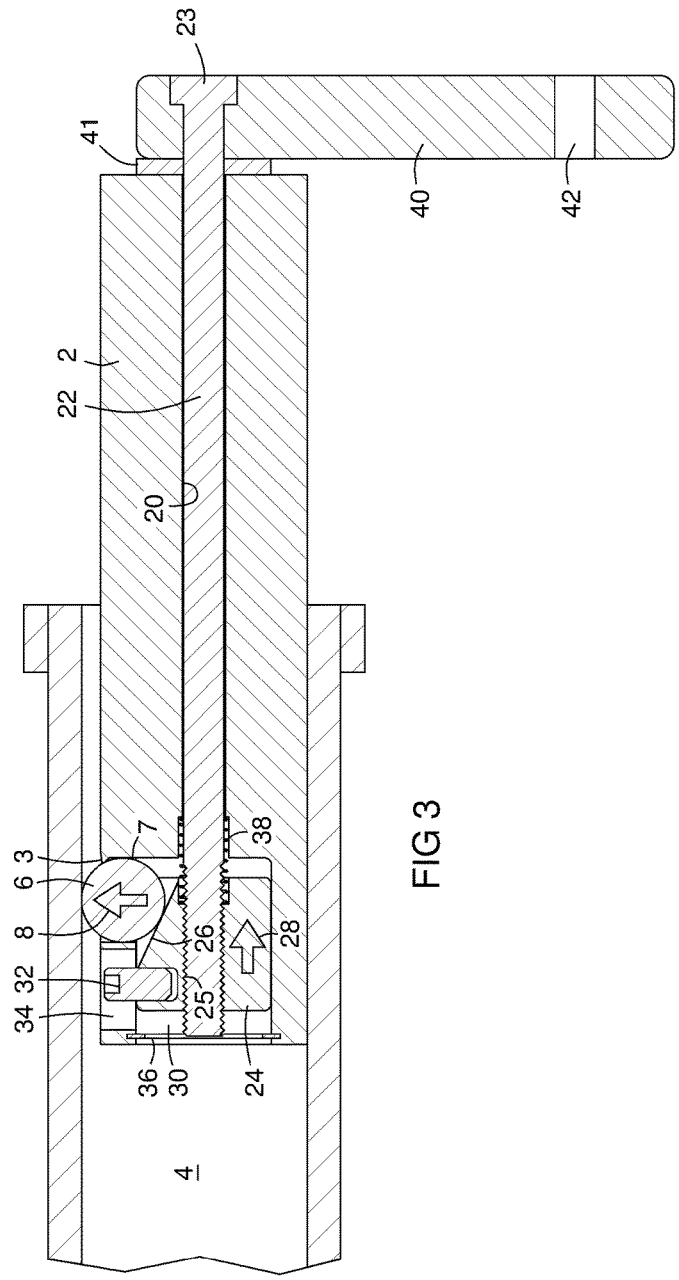
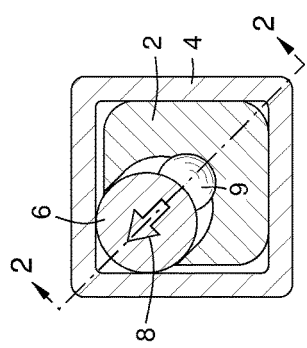
FIG 2 PRIOR ART
FIG 3
FIG 1 PRIOR ART

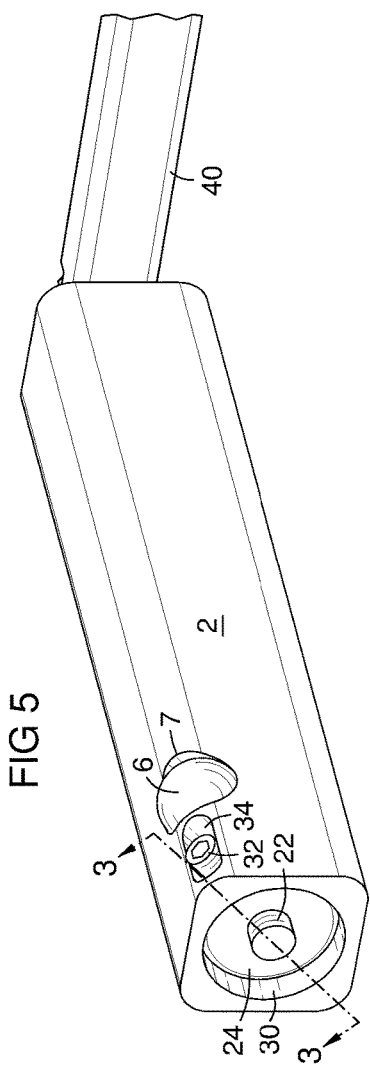
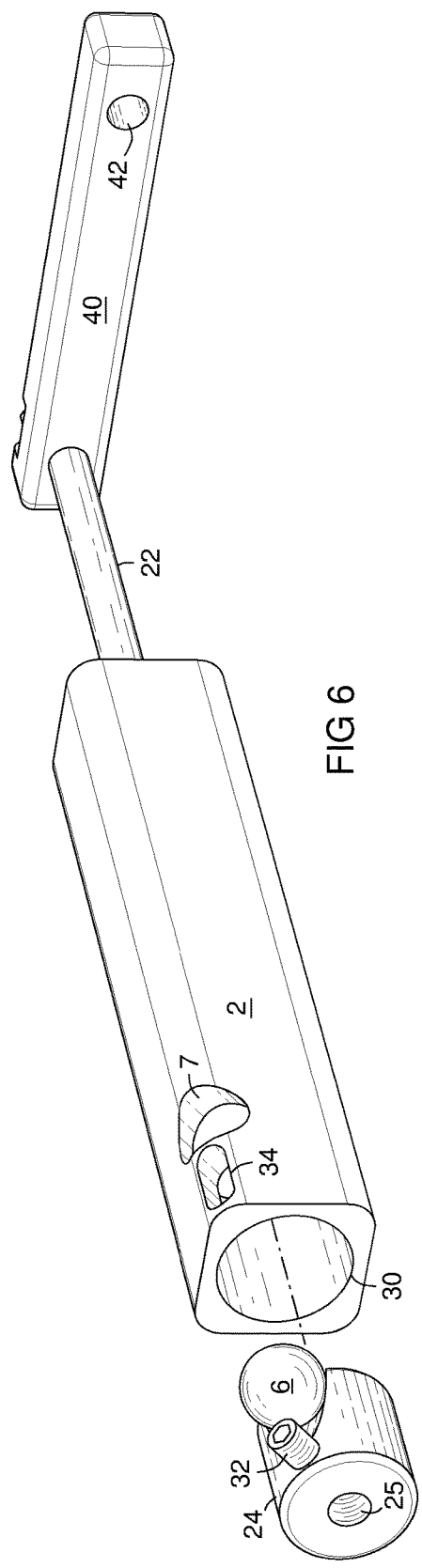
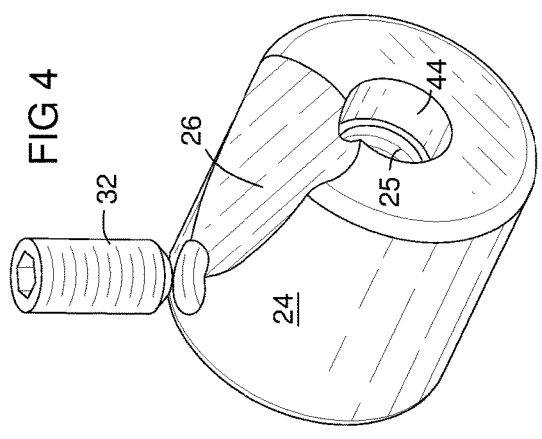

TRAILER HITCH DRAWBAR TIGHTENING MECHANISM

FIELD OF THE INVENTION

This invention relates to mechanisms that tighten a drawbar in a trailer hitch receiver tube to remove play between the drawbar and the receiver tube.

BACKGROUND OF THE INVENTION

A common type of trailer hitch provides a receiver tube attached to the back end of a motor vehicle frame or chassis below the bumper. A drawbar is inserted into the receiver tube and is retained therein by a pin passing through the sides of the receiver tube and the drawbar. The pin is retained by a cotter pin or other means. The drawbar can have a ball for towing a trailer, or it may support an accessory such as a bicycle carrier. The pin retains the drawbar in the receiver, but it does not remove play between the drawbar and the receiver tube. An accessory such as a bike carrier attached to the drawbar can force a user to reach around, under, or through the accessory, to insert the pin in an awkward body position.

The present inventor has invented prior mechanisms for tightening a drawbar in a receiver tube by turning a bolt or lever at the back end of the drawbar. Some of these are disclosed in patent documents listed in the Information Disclosure Statement. Another mechanism he invented and sold in 2008 but did not patent is shown in prior art figures herein.

SUMMARY OF THE INVENTION

The present mechanism has advantages over the inventor's past designs and any known other prior art. According to one aspect, a translation screw extends through the drawbar from back to front. It may have a manual lever at the back of the drawbar for turning the screw. A special nut on the front end of the screw has a ramp that extends a captive ball from a hole in a side of the drawbar when the translation screw is turned. The ball presses against the inner surface of the receiver tube, pressing the drawbar against the opposite side of the receiver tube, removing all play between the drawbar and the receiver tube.

BRIEF DESCRIPTION OF THE DRAWINGS

The invention is explained in the following description in view of the drawings that show:

FIG. 1 is a transverse sectional view of a prior mechanism of present inventor.

FIG. 2 is a sectional view taken on line 2-2 of FIG. 1.

FIG. 3 is a sectional view of the present invention taken on line 3-3 of FIG. 5.

FIG. 4 is an enlarged perspective view of a ramp nut according to the invention.

FIG. 5 is a perspective view of a drawbar assembly according to the invention.

FIG. 6 is a partly exploded view of the assembly of FIG. 5.

DETAILED DESCRIPTION OF THE INVENTION

FIG. 1 is a transverse sectional view through a drawbar 2 in a trailer hitch receiver tube 4 showing a captive ball 6 pushed diagonally upward 8 by a ball end 9 of a push-rod 10 (FIG. 2). This illustrates a prior drawbar tightening mechanism of the present inventor. The captive ball 6 pushes against the upper left corner of the receiver tube, forcing the drawbar 2 against the bottom and right inner surfaces of the receiver tube. This eliminates all play and movement of the drawbar in the receiver tube under load and vibration during travel. A lip 3 around at least part of an outer edge of a captive ball retention chamber 7 retains the captive ball.

FIG. 2 is a sectional view taken on line 2-2 of FIG. 1, showing a ball end 9 at the front of the push-rod 10 pushing against the captive ball by tightening a bolt 12 that pushes forward on the push-rod 10. A potential problem is that the captive ball 6 can jam the push-rod in its guide hole 14. This prevents retraction of the push-rod since the bolt 12 cannot forcibly retract the push-rod. This especially can happen if the captive ball 6 dents the ball end 9 of the push-rod, deforming and enlarging it.

FIG. 3 shows aspects of the present invention. The drawbar 2 has an unthreaded passageway 20 for a translation screw 22 that passes through the drawbar from back to front. The translation screw is threaded into a ramp nut 24 with internal threads 25 and a ramp 26. When the translation screw is tightened, it pulls the ramp nut backward 28. The ramp pushes 8 a captive ball 6 to extend from the drawbar. This eliminates all play between the drawbar and the receiver tube. A lip 3 may be provided around at least part of the outer edge of the ball chamber 7 to retain the captive ball.

A ramp nut chamber 30 in the front end of the drawbar contains the ramp nut 24 for longitudinal sliding movement. The ramp nut may be retained in the ramp nut chamber 30 by a setscrew 32 or pin extending from a perimeter of the ramp nut that slides in a longitudinal slot 34 in the drawbar. Alternately, the ramp nut may be retained in the ramp nut chamber 30 by an internal circlip 36. A compression spring 38 may be provided to act between the ramp nut 24 and the drawbar to move the ramp nut forward when the translation screw is loosened, retracting the captive ball. If the ramp nut jams in the ramp nut chamber 30, it can be released by tapping the head 23 of the translation screw. However, jamming is unlikely if the ramp 26 is a cylindrical trough as later shown. This shape distributes stress of the captive ball on the ramp to prevent the captive ball from denting the ramp. A lever 40 may be provided at the back end of the translation screw 22, eliminating the need for a separate wrench or hex key. A washer 41 of a low-friction material such as Delrin® or another plastic may be disposed between the lever and the drawbar. The translation screw may be a threaded or partly threaded bolt with a head that retains the lever as a mounted wrench. A hole 42 for a lock shackle may be provided in the lever to secure it to a structure such as a crossbar attached to the drawbar.

The ramp nut 24 and ramp nut chamber 30 are preferably cylindrical as shown. The ball chamber 7 preferably extends diagonally through a corner of the drawbar as shown. This provides maximum room for the captive ball to be retained and to operate between the ramp 26 and the exterior of the drawbar. Alternately, the captive ball can extend from a flat side of the drawbar.

FIG. 4 shows a ramp nut 24 with internal threads 25 for the translation screw 22 (FIG. 3) and a ramp 26. The ramp may be formed as a cylindrical trough to minimize stress concentration of the captive ball on the ramp. For example, it may be formed with a ball end mill. The ramp may have a slightly larger cylindrical diameter than the captive ball 6 (FIG. 6). For example, it may have a diameter 0.1% to 0.5% larger than the diameter of the captive ball to best distribute stress without binding the captive ball. Alternately, the ramp may be another shape, for example planar. A setscrew 32 or pin may be inserted into the ramp nut after the ramp nut is placed in the ramp nut chamber 30 (FIG. 5). The ramp nut 24 may have a spring chamber 44 to retain a compression spring 38 (FIG. 3) around the translation screw 22 (FIG. 3) that acts between the ramp nut and the drawbar.

FIG. 5 is a perspective view of the drawbar 2 with the ramp nut 24 in the ramp nut chamber 30 and retained therein by a setscrew 32 that slides in a longitudinal slot 34 in the drawbar 2 to retain the ramp nut in the drawbar. The threaded connection of the ramp nut to the translation screw 22 also retains the ramp nut. The setscrew rotationally indexes the ramp nut, which is also done by the captive ball 6 in the cylindrical trough 26 (FIG. 4). FIG. 6 is a partly exploded view of the present drawbar tightening mechanism.

The invention provides convenient, fast, and secure means for tightening a drawbar in a hitch receiver. This is useful for example to attach an accessory such as a bike carrier to a trailer hitch receiver.

While embodiments of the present invention have been shown and described herein, such embodiments are provided as examples only. Changes and substitutions may be made without departing from the invention. Accordingly, the invention should be limited only by the intended meaning and scope of the claims.

The invention claimed is:

1. A trailer hitch drawbar tightening mechanism comprising:
   a drawbar for a trailer hitch receiver tube;
   a translation screw in the drawbar passing from a back end to a front end of the drawbar;
   a ramp nut threaded onto the translation screw in a ramp nut chamber in the drawbar;
   a captive ball in a captive ball retention chamber spanning between the ramp nut chamber and an exterior of the drawbar; and
   a ramp on the ramp nut that pushes the captive ball to extend beyond the exterior of the drawbar when the translation screw is turned.

2. The trailer hitch drawbar tightening mechanism of claim 1, wherein the ramp is oriented to push the captive ball to extend when the translation screw is tightened at the back end of the drawbar.

3. The trailer hitch drawbar tightening mechanism of claim 1, wherein the ramp faces the back end of the drawbar so the ramp pushes the captive ball to extend when the translation screw is tightened from the back end of the drawbar.

4. The trailer hitch drawbar tightening mechanism of claim 1, further comprising a setscrew or pin extending from a perimeter of the ramp nut and sliding longitudinally in a longitudinally elongated slot in the drawbar that passes between the ramp nut chamber and the exterior of the drawbar.

5. The trailer hitch drawbar tightening mechanism of claim 1, further comprising an internal circlip around a front end of the ramp nut chamber that retains the ramp nut in the drawbar.

6. The trailer hitch drawbar tightening mechanism of claim 1, wherein the ramp comprises a cylindrical trough.

7. The trailer hitch drawbar tightening mechanism of claim 1, wherein the ramp comprises a cylindrical trough with a cylindrical diameter 0.1% to 0.5% greater than a diameter of the captive ball.

8. The trailer hitch drawbar tightening mechanism of claim 1, wherein the drawbar is square or rectangular in transverse section, and the captive ball extends diagonally from a corner of the drawbar as seen in the transverse section.

9. The trailer hitch drawbar tightening mechanism of claim 1, wherein the captive ball is retained in a captive ball passage between the ramp nut chamber and a corner of the drawbar as seen in the transverse section.

10. The trailer hitch drawbar tightening mechanism of claim 1, wherein the translation screw comprises a threaded or partly threaded bolt with a head that retains a lever as a wrench mounted on the bolt.

11. The trailer hitch drawbar tightening mechanism of claim 1, further comprising a spring acting between the drawbar and the ramp nut and urging the ramp nut forward in the ramp nut chamber.

12. A trailer hitch drawbar tightening mechanism comprising:
   a drawbar for a trailer hitch receiver tube;
   a translation screw in the drawbar passing from a back end to a front end of the drawbar in a longitudinal unthreaded passage in the drawbar;
   a ramp nut threaded onto the translation screw in a ramp nut chamber in the front end of the drawbar;
   a captive ball in a captive ball retention chamber passing between the ramp nut chamber and an exterior of the drawbar; and
   a ramp on the ramp nut that pushes the ball to extend beyond the exterior of the drawbar when the translation screw is turned in a direction that moves the ramp nut backward in the ramp nut chamber.

13. The trailer hitch drawbar tightening mechanism of claim 12, wherein the ramp comprises a cylindrical trough.

14. The trailer hitch drawbar tightening mechanism of claim 12, wherein the ramp comprises a cylindrical trough with a cylindrical diameter 0.1% to 0.5% greater than a diameter of the captive ball.

15. The trailer hitch drawbar tightening mechanism of claim 12, wherein the drawbar is square or rectangular in transverse section, and the captive ball extends diagonally from a corner of the drawbar as seen in the transverse section.

16. The trailer hitch drawbar tightening mechanism of claim 12, wherein the ramp nut is retained in the ramp nut chamber by a setscrew or pin extending from a periphery of the ramp nut, wherein the setscrew or pin is limited to sliding longitudinally within a longitudinally elongated slot in the drawbar passing between the ramp nut chamber and the exterior of the drawbar.

17. The trailer hitch drawbar tightening mechanism of claim 12, wherein the ramp nut is retained in the ramp nut chamber by an internal circlip in a front end of the ramp nut chamber.

18. The trailer hitch drawbar tightening mechanism of claim 12, further comprising a spring acting between the drawbar and the ramp nut and urging the ramp nut forward in the ramp nut chamber.

\* \* \* \* \*